United States Patent
Kniss et al.

(10) Patent No.: US 9,108,319 B2
(45) Date of Patent: Aug. 18, 2015

(54) ELECTRIC SUCTION CUP

(75) Inventors: Jason M. Kniss, Garden City, MI (US); Maurice Perlman, Oak Park, MI (US); James Geary, Pawcatuck, CT (US); Orlando Trujillo, Westland, MI (US); Gary R. Michels, Macomb Township, MI (US); Jeffery J. Mruzik, Livonia, MI (US)

(73) Assignee: Delaware Capital Formation, Inc., Wilmington, DE (US)

( * ) Notice: Subject to any disclaimer, the term of this patent is extended or adjusted under 35 U.S.C. 154(b) by 0 days.

(21) Appl. No.: 13/018,704

(22) Filed: Feb. 1, 2011

(65) Prior Publication Data

US 2012/0193500 A1    Aug. 2, 2012

(51) Int. Cl.
*F16B 47/00* (2006.01)
*B25J 15/06* (2006.01)
*B25B 11/00* (2006.01)
*B65G 47/91* (2006.01)
*B65G 49/06* (2006.01)

(52) U.S. Cl.
CPC ........... *B25J 15/0616* (2013.01); *B25B 11/007* (2013.01); *B65G 47/91* (2013.01); *B65G 49/061* (2013.01); *B65G 2249/045* (2013.01)

(58) Field of Classification Search
USPC ................ 248/363, 205.5, 205.7, 206.2, 262, 248/205.8, 205.9, 206.1, 206.3, 206.4, 362
See application file for complete search history.

(56) References Cited

U.S. PATENT DOCUMENTS

| | | |
|---|---|---|
| 1,448,690 A | 3/1923 | Hetzer et al. |
| 2,798,757 A | 7/1957 | Jackson |
| 2,850,279 A | 9/1958 | Stoothoff et al. |
| 2,934,086 A | 4/1960 | Blatt |
| 3,020,017 A | 2/1962 | Watson |
| 3,180,604 A | 4/1965 | Hammer |
| 3,330,589 A | 7/1967 | Mumma |
| 3,702,698 A | 11/1972 | Schwebel |
| 3,804,397 A | 4/1974 | Neumann |
| 4,073,602 A | 2/1978 | Cagle |
| 4,121,865 A | 10/1978 | Littwin, Sr. |
| 4,453,285 A | 6/1984 | Van Rosberg |
| 4,453,755 A | 6/1984 | Blatt et al. |
| 4,470,585 A | 9/1984 | Bavelloni |
| 4,582,353 A | 4/1986 | Alvernhe |
| 4,651,396 A | 3/1987 | Kerlidou |
| 4,707,012 A | 11/1987 | Takagi |
| 4,763,941 A | 8/1988 | Sniderman |
| 4,828,306 A | 5/1989 | Blatt |
| 4,955,493 A * | 9/1990 | Touzani .................... 215/372 |
| 4,995,662 A | 2/1991 | Hawkswell |
| 5,059,088 A | 10/1991 | Klein |

(Continued)

FOREIGN PATENT DOCUMENTS

| | | | |
|---|---|---|---|
| EP | 0 694 898 | 1/1996 | |
| WO | WO 2010110719 A1 * | 9/2010 | ............... B25J 15/06 |

*Primary Examiner* — Monica Millner
(74) *Attorney, Agent, or Firm* — Harness, Dickey & Pierce, P.L.C.

(57) ABSTRACT

A suction cup assembly has a housing with an actuator in the housing. A flexible cup is coupled with the housing. The actuator movement causes the flexible cup to move between at least two positions. In a first position, the flexible cup moves into an increased volume position. In a second position, the flexible cup moves into at least a neutral volume position. In the increased volume position, the flexible cup seals with a surface. In the neutral volume position, the flexible cup releases from the surface.

18 Claims, 9 Drawing Sheets

(56) References Cited

U.S. PATENT DOCUMENTS

| | | |
|---|---|---|
| 5,169,192 A | 12/1992 | Allison et al. |
| 5,201,875 A | 4/1993 | Tessier et al. |
| 5,387,068 A * | 2/1995 | Pearson ............... 414/404 |
| 5,582,450 A * | 12/1996 | Nagai et al. ............ 294/189 |
| 5,626,378 A | 5/1997 | Puhl et al. |
| 5,639,553 A * | 6/1997 | Nagai et al. ............ 428/409 |
| 5,795,001 A | 8/1998 | Burke |
| 5,882,055 A * | 3/1999 | Smith ............... 414/752.1 |
| 6,000,122 A * | 12/1999 | Uchida et al. ............ 29/740 |
| 6,024,392 A | 2/2000 | Blatt |
| 6,065,789 A | 5/2000 | Nagai et al. |
| 6,244,778 B1 | 6/2001 | Chesbrough |
| 6,382,692 B1 * | 5/2002 | Schmalz et al. ........... 294/189 |
| 6,502,877 B2 * | 1/2003 | Schick et al. ............ 294/65 |
| 6,595,259 B2 | 7/2003 | Whitby |
| 6,729,852 B2 * | 5/2004 | Schnatterer ............ 417/189 |
| 6,837,852 B2 | 1/2005 | Wu et al. |
| 6,979,032 B2 * | 12/2005 | Damhuis ............ 294/65 |
| 7,222,901 B2 | 5/2007 | Gebauer et al. |
| 7,404,536 B2 | 7/2008 | Kalb |
| 7,681,603 B2 * | 3/2010 | Perlman et al. ............ 141/65 |
| 7,712,807 B2 * | 5/2010 | Perlman et al. ............ 294/185 |
| 7,950,422 B2 * | 5/2011 | Perlman et al. ............ 141/65 |
| 7,963,578 B2 * | 6/2011 | Wells et al. ............ 294/2 |
| 8,096,537 B2 * | 1/2012 | Browne et al. ............ 269/21 |
| 2003/0151182 A1 * | 8/2003 | Bavelloni ............ 269/21 |
| 2004/0094979 A1 * | 5/2004 | Damhuis ............ 294/65 |
| 2008/0078896 A1 | 4/2008 | Browne et al. |
| 2008/0129063 A1 | 6/2008 | Kang et al. |

* cited by examiner

ELECTRIC SUCTION CUP

FIELD

The present disclosure relates to suction cups and, more specifically, to volume displacement suction cups with electric actuation.

BACKGROUND

Suction cups are used in numerous applications. Ordinarily, the suctions cups are of a pneumatic open loop type where a vacuum is created in the suction cup via a venturi to draw the suction cup onto a surface. The air is passed through the venturi and exits to the ambient surroundings. While these types of suction cups work satisfactorily for their intended purpose, they purpose a drawback when utilized in clean room environments, non-contaminating environments and the like. Thus, these types of systems are not adaptable to be used in pharmaceutical, electronic, and food processing operations where contaminants from the exiting air would have a significant impact on the products being processed. Accordingly, it is desirable to have a suction cup that is capable of drawing a vacuum without the use of open loop pneumatics. Additionally, the suction cups are to be sterilized, cleaned and inspected without the risk of contamination.

SUMMARY

According to the present disclosure, a vacuum generator to draw air from inside of the vacuum cup and exhaust the air through an exhaust port orifice into ambient surroundings is eliminated. The present disclosure provides a vacuum cup that is to be in contact with the part. The cup's internal volume is increased which, in turn, causes the pressure level inside the cup to drop relative to atmospheric pressure creating a vacuum inside the cup enabling the cup to lift the part. The suction cup volume is controlled by an actuator. Ordinarily, the cup has a center position, a retracted position or increased volume position, and a neutral or negative volume position that ejects the part from the suction cup. The present device is devoid of threads, crevasses, cracks, ports, flat surfaces or orifices that may be exposed to or harbor contamination. The device is hermetically sealed so that it may be utilized in sterile or clean environments.

According to an aspect of the present disclosure, an electrical suction cup comprises a housing with an electrical actuator in the housing. A flexible cup is coupled with the housing. The cup is engagable with a surface of a part to be manipulated. The cup is coupled with the actuator so that movement of the actuator causes the flexible cup to deform between an increase volume position and a neutral or negative volume position. In the increase volume position, the flexible cup seals with the surface to enable the creation of a vacuum inside of the cup to lift or manipulate the part. In the neutral or negative volume position, the flexible cup is released from the surface or the part. The flexible cup is sealed with the housing. The actuator may be a three position solenoid coupled with a flexible cup. The actuator may be a magnetically latched solenoid coupled with a flexible cup. The actuator may be a servo motor with a lead screw coupled with a flexible cup. The flexible cup further includes a flexible wall. The flexible wall enables deformation of the cup. The actuator includes a mounting portion coupled with the flexible wall. A cam lever is coupled with the cup and the actuator is coupled with the cam lever.

According to a second aspect of the disclosure, a suction cup devoid of pneumatic lines comprises a housing and electrical actuator in the housing. A suction cup is secured to the housing. The suction cup couples with the electrical actuator so that the actuator movement causes the flexible cup to deform between an increased volume position and a neutral or negative volume position. In the increased volume position, the flexible cup seals against a surface of a part to be manipulated. In the neutral or negative volume position, the flexible cup is released from the surface. The actuator may be a three position solenoid coupled with the flexible cup. The flexible cup includes a flexible wall. The actuator may be a magnetically latched solenoid coupled with a flexible cup. The actuator may be a servo motor with a lead screw coupled with a flexible cup. The flexible wall enables deformation of the flexible cup. The electrical actuator is coupled with the flexible wall. The suction cup is sealed with the housing to provide an airtight seal.

According to a third aspect of the disclosure, a suction cup comprises a housing with an actuator in the housing. A flexible cup is hermetically sealed with the housing. The actuator is coupled with the cup so that movement of the actuator causes the flexible cup to deform between an increased volume position and a neutral or negative volume position. In the increased volume position, the flexible cup seals against a surface of a part. In the neutral or negative volume position, the flexible cup is released from the surface. The actuator may be an electrical solenoid or servo motor. The actuator may be a closed pneumatic actuator. The flexible cup includes a flexible wall. The flexible wall enables deformation of the cup. The actuator includes a mounting portion to couple with the flexible wall. A cam lever is coupled with the cup and the actuator is coupled with the cam lever.

Further areas of applicability will become apparent from the description provided herein. The description and specific examples in this summary are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
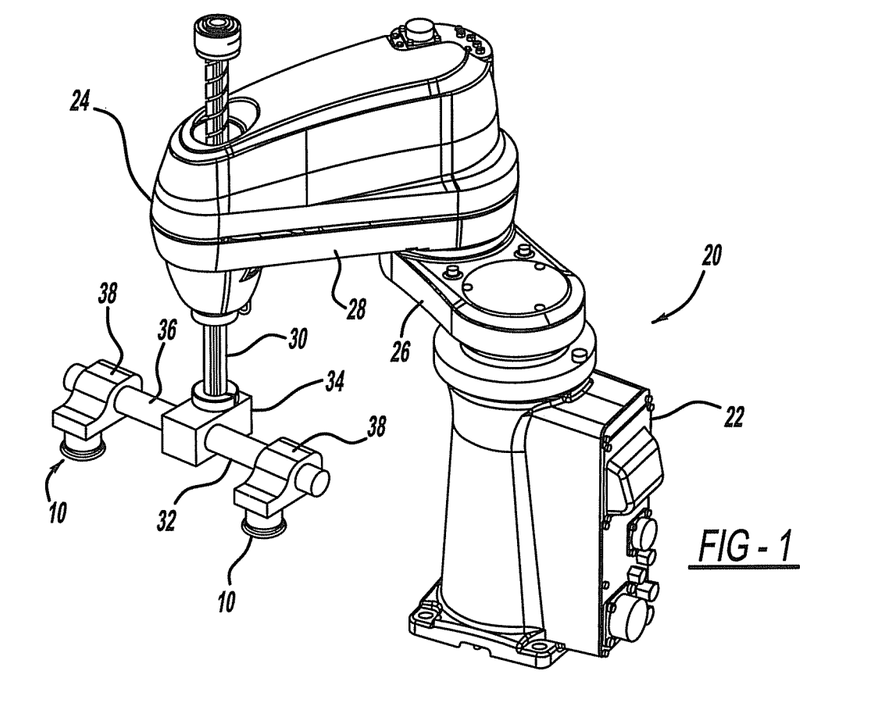
FIG. 1 is a perspective view of suction cup assemblies arranged on a material handling apparatus.
Figure 2:
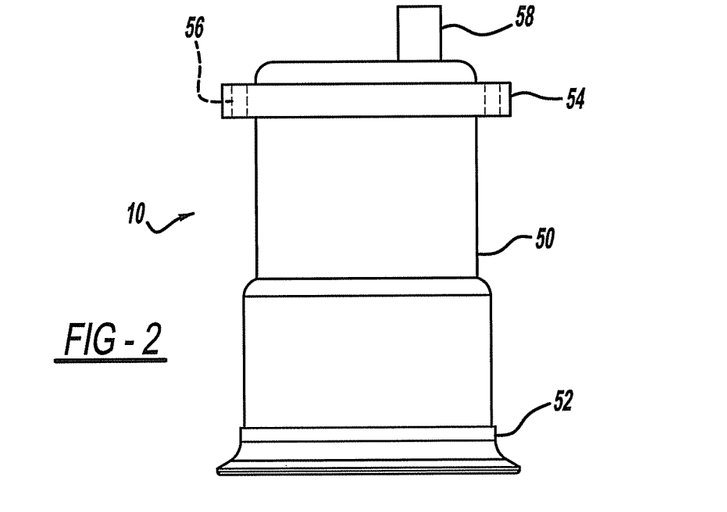
FIG. 2 is a perspective view of a suction cup assembly of FIG. 1.

Turning to the figures, FIG. 1 illustrates a suction cup assembly 10 secured to a material handling apparatus 20. The material handling system 20 is generally designed as a robotic arm. The arm includes a base 22 and a swing arm portion 24. The swing arm portion 24 includes a pair of members 26 and 28 that enable the arm to swing about various positions along the arm's path. The member 28 includes a rotatable shaft 30. The rotatable shaft 30, while rotating, may also move up and down. An arm end effector 32 is connected with the rotatable shaft 30. The arm end effector 32 includes a block 34 that couples with the shaft 30. Additionally, a shaft 36 projects through the block 34. End members 38 are coupled with the shaft 36. Additionally, the suction cup assemblies 10 are secured with the end members 38. Thus, the material handling apparatus 20 is programmed to move the suction cup assemblies 10, via the arm 24, from a position attaching the suction cups with the part to be moved to a discharge position wherein the suction cups are removed from the part.

Turning to FIGS. 2-5, the suction cup assembly 10 is illustrated. The suction cup assembly 10 includes a housing 50, a flexible cup 52 and a mounting ring 54. The housing 50 has an overall right circular cylindrical shape; however, many different configurations, such as square, rectangle, oval or the like, may be used. The flexible cup 52 is generally hermetically sealed with the housing 50. The mounting ring 54 includes a plurality of bores 56 that are generally threaded. An electrical connection 58 projects from the housing 50.

Figures 3, 4, 5:
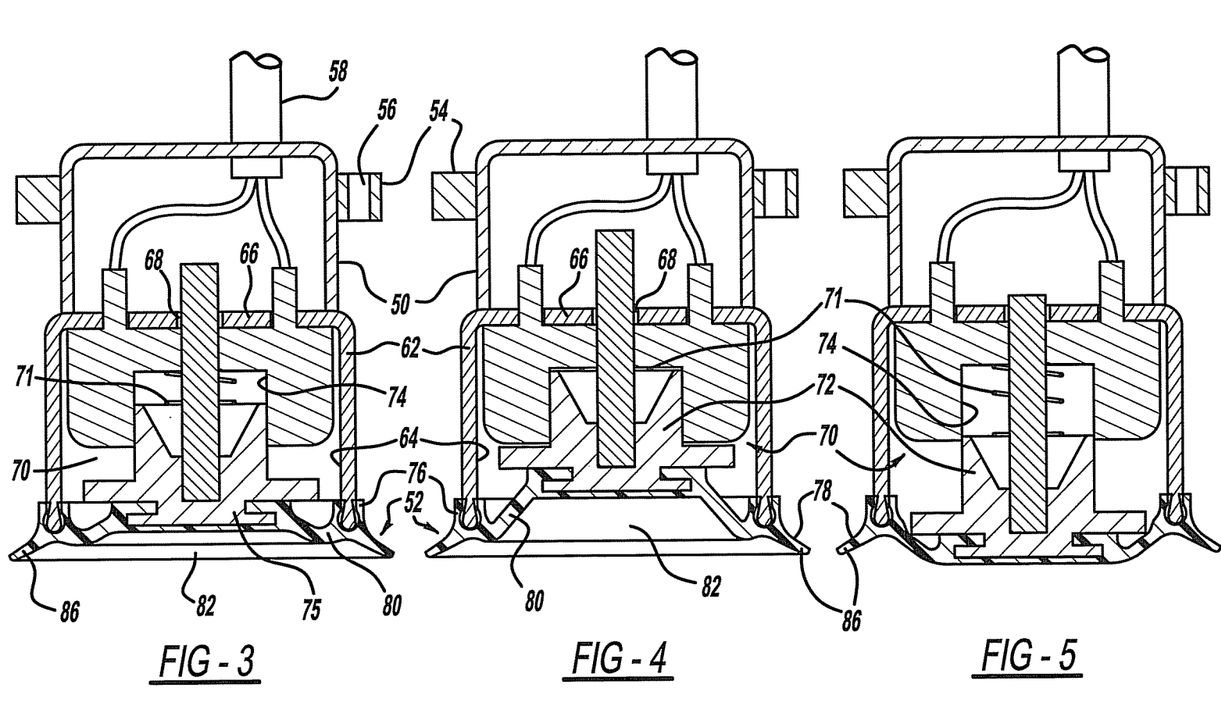
FIG. 3 is a cross-section view of the suction cup assembly of FIG. 2 in a neutral position.
FIG. 4 is a view like FIG. 3 with the suction cup assembly in an increased volume position.
FIG. 5 is a view like FIG. 3 with the suction cup assembly in a negative volume position.

The housing 50 has a wall 62 that defines an internal chamber 64. The internal chamber 64 includes a mounting surface 66 with a through bore 68. A solenoid 70 is housed in the housing chamber 64. The solenoid 70 is generally a three positioned solenoid including centering springs 71 to center the solenoid armature 72 in the solenoid 70 as illustrated in FIG. 3. The solenoid includes a bore 74 that receives the solenoid armature 72. The solenoid armature 72 includes a mounting armature portion 75 to couple with the flexible cup 52. The cup 52 is bonded or molded to the armature mounting portion 75. Power is supplied to the solenoid 70, via wires, coupled with the wire harness connector 58. The solenoid 70 generally operates in an on/off fashion as will be described below.

The flexible cup 52 has an overall cone shape with an upper cylindrical portion 76 and a lower conical portion 78. The upper cylindrical portion 76 surrounds the housing 50 and is hermetically sealed with it. Thus, the cup 52 and housing 50 are sealed from the outside against contaminants and environmental effects. A flexible wall 80 is positioned between a cup chamber 82 and the housing chamber 64. The cup lip 86 contacts the surface that is to be manipulated by the suction cup 10. The flexible wall 80 is deformable into housing chamber 64 as illustrated in FIG. 4. The deformable flexible wall 80 enables the creation of suction in the cup chamber 82. The solenoid armature mounting portion 75 is secured with the flexible wall 80.

In operation, the suction cup assembly 10 includes the solenoid armature 72 in a neutral position in the solenoid 70 as illustrated in FIG. 3. Here, the flexible cup 52 may be positioned into contact with a surface of a part to be manipulated. The flexible cup 52 is positioned onto the surface. The cup lip 86 contacts the surface. The solenoid 70 is activated to draw the solenoid armature 72 into the solenoid bore 74. As this occurs, the flexible wall 80 deforms and moves into the housing chamber 64. As this occurs, the cup chamber 82 is deformed. The deformation of the cup chamber 82 increases its volume by two to three times as seen in FIG. 4. As this occurs, it causes the pressure level inside the cup chamber 82 to drop relative to atmospheric pressure, creating a vacuum inside of the cup chamber 82. Thus, the lip 86 secures and seals with the surface of the part to be manipulated.

After the part has been moved to its desired position, power in the solenoid 70 is reversed. As this occurs, the solenoid armature 72 reverses its direction which, in turn, causes the mounting portion 75 to push against the flexible wall 80. As this occurs, the flexible wall 80 exits the cup chamber 82 as illustrated in FIG. 5. This causes a negative volume in the cup chamber 82 forcing the part from the flexible cup 52. Thus, by a simple reversal of current in the solenoid 70, the suction cup 52 moves from a first position, where a vacuum in the cup chamber 82 will increase due to the increased volume position of the cup chamber, to a second position, where the cup chamber 82 is in a negative volume position, where the part being manipulated or held by the flexible cup 52 is released from it.

The suction cup assembly 10, due to the solenoid 70, can be activated and controlled at a rapid pace. The suction cup assembly 10 does not include any threads, crevasses, cracks, ports, flat surfaces, or orifices that may be exposed to or harbor contamination. Thus, the suction cup assembly 10 can be easily washed down and cleaned. Since the solenoid 70 is electrically activated, the suction cup assembly 10 is devoid of pneumatic lines. Thus, there is no risk of contamination due to pneumatic leakage. Accordingly, the suction cup assembly 10 is easily sterilized, cleaned and inspected. Thus, the suction cup assembly 10 is readily available for use in the food processing industry that requires no contamination and requires wash down of the entire apparatus. Also, the present suction cup assembly 10 may be used in clean room environments as well as pharmaceutical and electronic manufacturing.

Figure 6:
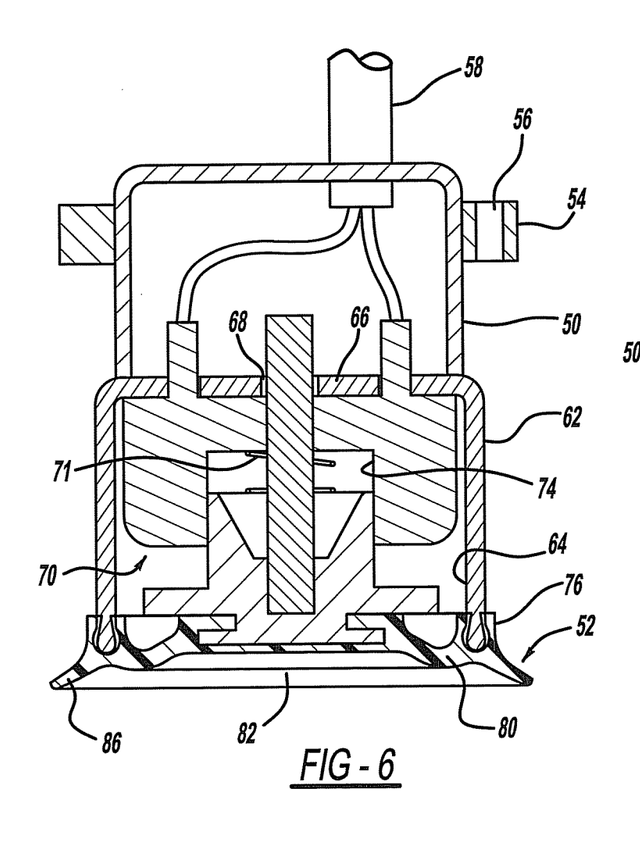
FIG. 6 is a cross-section view of the suction cup assembly like FIG. 3 in a neutral position.
Figure 7:
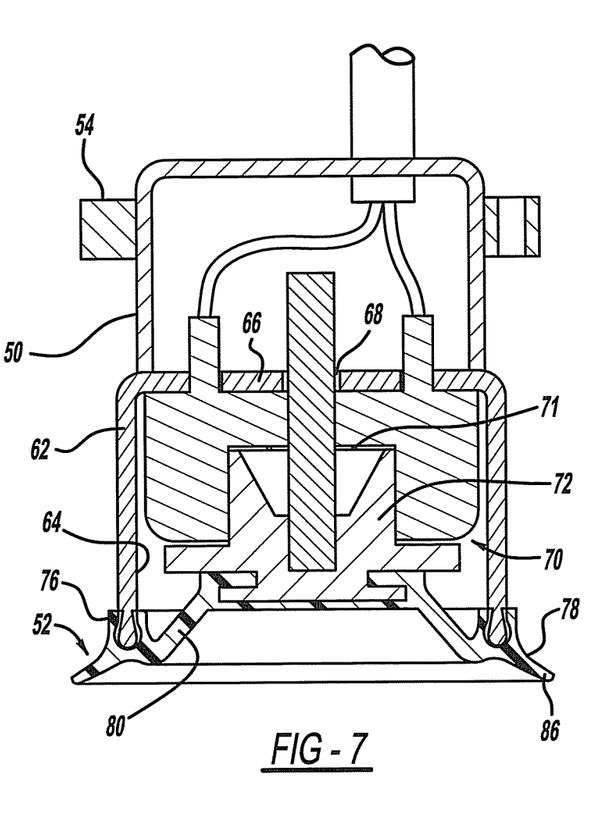
FIG. 7 is a cross-section view of a suction cup assembly in an increased volume position.

Turning to FIGS. 6 and 7, a suction cup assembly like that illustrated in FIGS. 2-5 is shown. The difference between the above assembly is in the solenoid 70. Here the solenoid 70' is a two position solenoid including centering spring 71 to center the solenoid aperture in the solenoid 70' as illustrated in FIG. 6. The remainder of the solenoid is like that previously disclosed and designated with the same reference numbers. The solenoid operates as follows.

In operation, the suction cup assembly includes the solenoid armature 72 in a neutral position in the solenoid 70' as illustrated in FIG. 6. Here the flexible cup 52 may be positioned into contact with the surface of a part to be manipulated. The flexible cup 52 is positioned onto a surface. The cup lip 86 contacts the surface. The flexible cup has a starting volume, zero or neutral volume. The solenoid 70' is activated to draw the solenoid armature 72 into the solenoid bore 74. As this occurs, the flexible wall 80 deforms and moves into the housing chamber 64 as illustrated in FIG. 7. As this occurs, the cup chamber 82 is deformed. The deformation of the cup chamber 82 increases its volume by 2 to 3 times as seen in FIG. 7. This causes the pressure level inside the cup chamber to drop relative to atmospheric pressure, creating a vacuum inside of the cup chamber. Thus, the lip 86 secures and seals with the surface of the part to be manipulated.

After the part has been moved to its desired position, the power in the solenoid is turned off. As this occurs, the solenoid armature 72 reverses its direction, via the spring 71, which returns the flexible cup 52 back to its starting position having its starting volume, zero or neutral volume. The flexible cup 52 is then removed from the part. Accordingly, by turning on and off the solenoid, the suction cup moves from a first position, where a vacuum in the cup increases due to the increased volume position of the cup chamber, to a second position, where the cup chamber is in its starting, zero or neutral volume position, so that the part being manipulated or held by the flexible cup 52 can be released from it.

Figure 8:
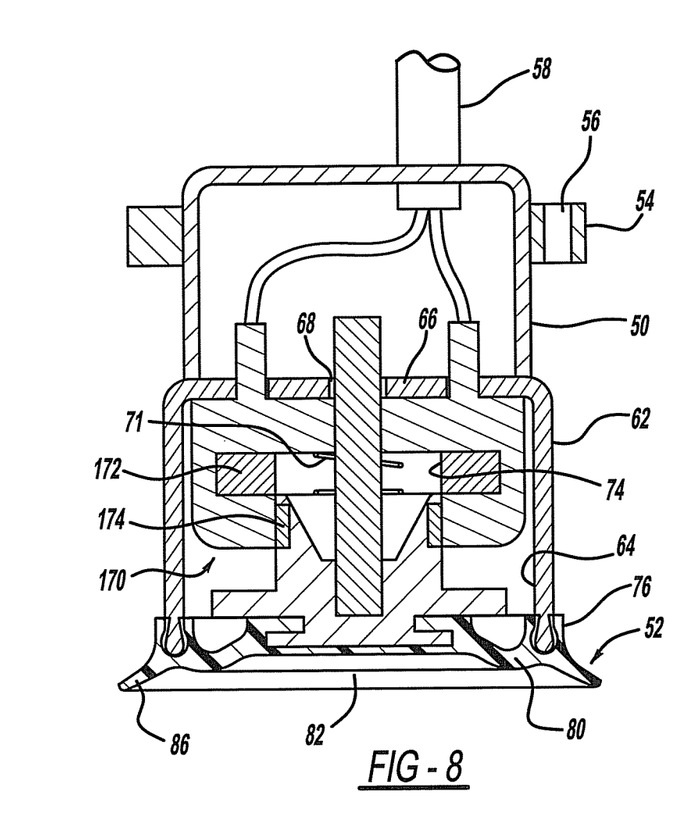
FIG. 8 is a cross-section view of another embodiment of a suction cup assembly of the present disclosure in a neutral position.
Figure 9:
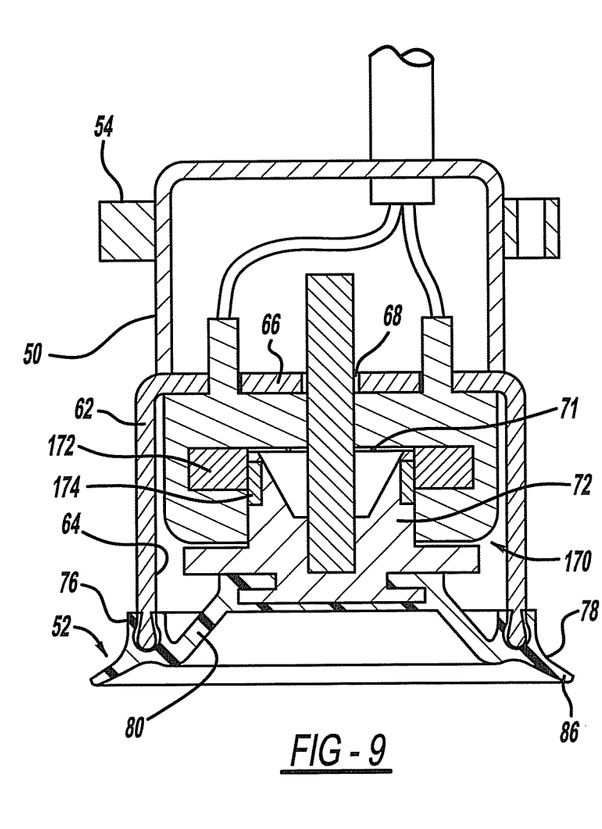
FIG. 9 is a view like FIG. 8 with the suction cup assembly in an increased volume position.

Turning to FIGS. 8 and 9, an additional embodiment is illustrated. The embodiment of FIGS. 8 and 9 is like that of FIGS. 3 and 4 with a different solenoid. Accordingly, the same parts, having substantially the same function, are designated with the same reference numbers.

Here, the difference is that the solenoid 170 is a magnetically latched solenoid. Thus, in the increased volume position, the solenoid armature 72 is magnetically held in position, as explained below. The solenoid 170 includes magnet 172 while the solenoid armature includes an annular magnet 174. Here, the magnets 172, 174 are illustrated with an annular or ring shape; however, any shape of magnet may be used.

In operation, the suction cup assembly 10 includes the solenoid armature 72 in a powered position as illustrated in FIG. 8. Here, the flexible cup 52 may be positioned into contact with the surface of a part to be manipulated. The flexible cup has a starting volume, zero or neutral volume. The cup lip 86 is in contact with the surface of the part. Power to the solenoid 170 is deactivated. The solenoid magnet 172 draws the solenoid armature magnet 174 into the solenoid bore 74 due to the magnetic attraction. As this occurs, the flexible wall 80 deforms and moves into the housing chamber 64. Thus, the cup chamber 82 is deformed. The deformation of the cup chamber 82 increases its volume by 2 to 3 times as seen in FIG. 9. This causes the pressure level inside the cup chamber 82 to drop relative to atmospheric pressure, creating a vacuum inside of the cup chamber 82. Thus, the lip 86 secures and seals with the surface of the part to be manipulated.

After the part has been moved to its desired position, power in the solenoid 170 is again activated. As this occurs, the solenoid aperture 72 reverses its direction which, in turn, causes the flexible cup 52 to return to its neutral or starting volume position. Thus, by activating and deactivating the solenoid 170, the suction cup 52 moves from a first position, where a vacuum in the cup chamber 82 will increase due to the increased volume position of the cup chamber, to a second position, wherein the cup chamber is in a starting, zero or neutral volume position, where the part being manipulated or held by the flexible cup is released from it.

Figures 10, 11:
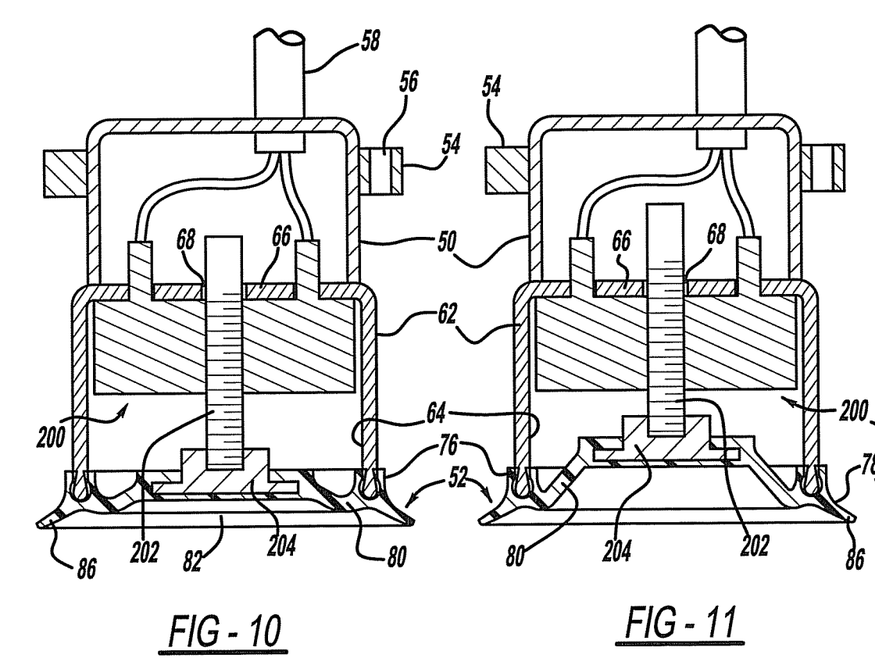
FIG. 10 is a cross-section view of an additional embodiment of a suction cup assembly in a neutral position.
FIG. 11 is a view like FIG. 10 with the suction cup assembly in an increased volume position.
Figure 12:
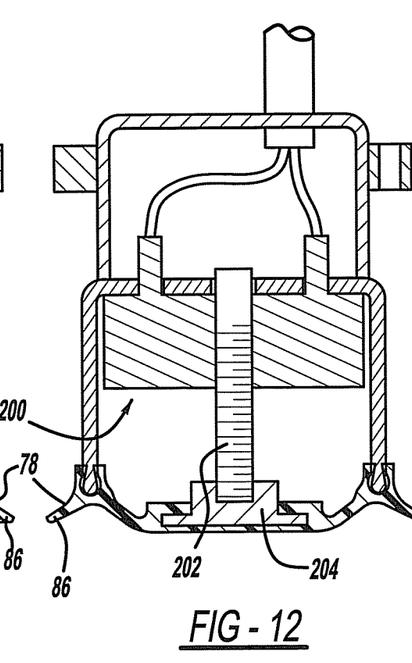
FIG. 12 is a view like FIG. 10 with the suction cup assembly in a negative volume position.

Turning to FIGS. 10-12, an additional embodiment is illustrated. In FIGS. 10-12, the solenoid has been replaced with a servo motor. However, the parts that function the same as in FIGS. 2-5 will be identified with the same reference numbers in FIGS. 10-12.

Turning to FIGS. 10-12, a servo motor 200 is positioned within the housing 50. The servo motor includes a threaded shaft 202 extending from it. The threaded shaft 202 includes a mounting portion 204 coupled with the flexible cup 52. The servo motor 200 includes three preprogrammed positions reached by sending three simple input signals to the servo motor. The signals correspond with to the starting, zero or neutral volume position (FIG. 10), increased volume position (FIG. 11) and negative volume position (FIG. 12) as described above.

In operation, the flexible cup 52 is positioned into contact with the surface of a part to be manipulated. The cup lip 86 contacts the surface. Here, the flexible cup 52 has a starting, zero or neutral volume. The servo motor 200 is activated. This draws the threaded shaft 202 into the servo motor 200. As this occurs, the flexible wall 80 deforms and moves into the housing chamber 64. Thus, the cup chamber 82 is deformed. The deformation of the cup chamber 82 increases its volume by 2 to 3 times as seen in FIG. 11. This causes the pressure level inside of the cup chamber 82 to drop relative to atmospheric pressure, creating a vacuum inside of the cup chamber 82. Thus, the lip 86 secures and seals with the surface of the part to be manipulated.

After the part has been moved to its desired position, the servo motor 200 is again powered. As this occurs, the shaft 202 reverses its direction which, in turn, causes the mounting portion 204 to push against the flexible wall 80. As this occurs, the flexible wall exits the cup chamber 82 as illustrated in FIG. 12. This causes a negative volume in the cup chamber 82 forcing the part from the flexible cup 52. Thus, by a simple reversal in rotation of the servo motor 200, the suction cup 52 moves from a first position, where a vacuum in the cup chamber will increase due to the increased volume position of the cup chamber, to a second position, where the cup chamber is in a negative position, where the part being manipulated or held by the flexible cup is released from it.

Additionally, the servo motor 200 could have preprogrammed two positions. Here, the servo motor would operate as illustrated in FIGS. 10 and 11. Thus, the cup 52 would operate between a starting, zero or neutral volume, and an increased volume as explained above.

Figure 13:
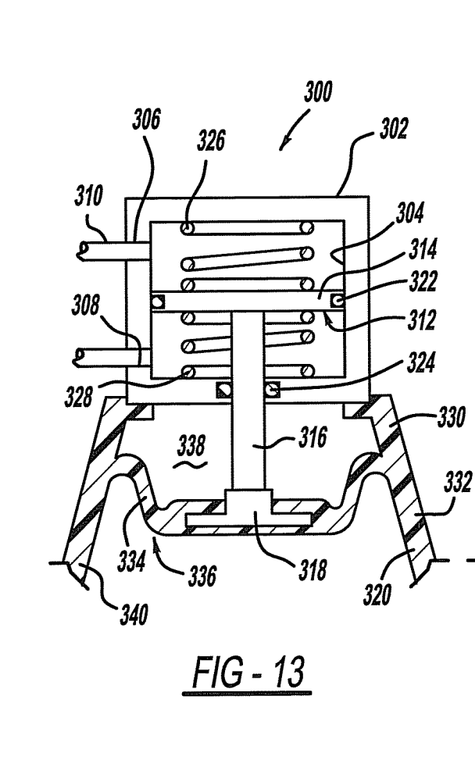
FIG. 13 is a cross-section view of another embodiment of a suction cup assembly in a neutral position.
Figure 14:
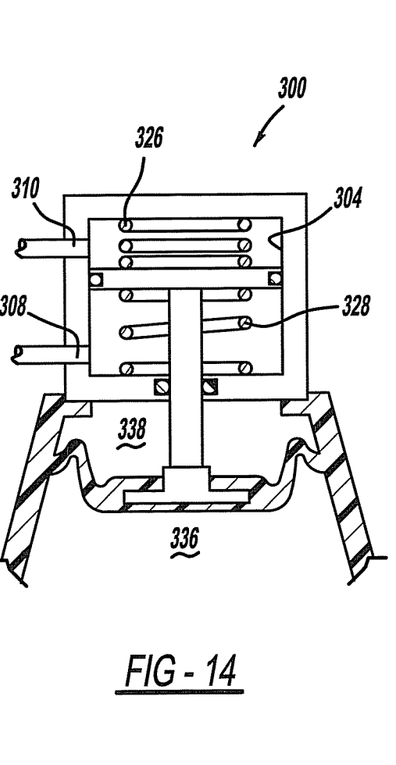
FIG. 14 is a view like FIG. 13 with the suction cup assembly in an increased volume position.
Figure 15:
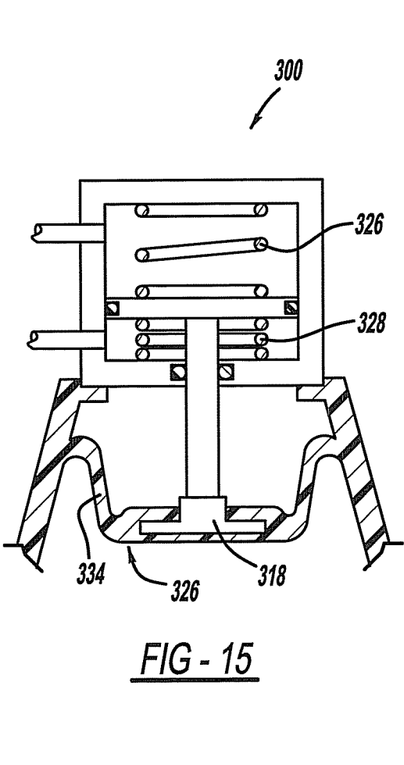
FIG. 15 is a view like FIG. 13 with the suction cup assembly in a negative volume position.

FIGS. 13-15 illustrate another embodiment of the present disclosure. Here, a closed loop pneumatic type of actuator is illustrated.

The actuator 300 includes a housing 302. The housing 302 includes a chamber 304 with an inlet 306 and an outlet 308. Pneumatic hoses 310 are coupled with the inlet 306 and the outlet 308. A piston assembly 312, including a piston 314 and a shaft 316 attached to the piston 314, is positioned in the housing chamber 304. The other end of the shaft includes a mounting portion 318 that connects with the cup 320. Seals 322, 324 seal the piston assembly 312 in the chamber 304. Springs 326, 328 are positioned on opposite sides of the piston 314. The springs 326, 328 maintain the piston 314 in a neutral position when pressure is not present in the actuator 300. Additionally, the springs 326, 328 assist in moving the piston 314 between positions.

The cup 320 is bonded or molded, hermetically sealing it, to the housing 302. The flexible cup 320 has an overall cone shape with an upper portion 330 and a lower portion 332. The upper portion 330 surrounds the housing 302 and is hermetically sealed with it. A flexible wall 334 is positioned between a cup chamber 336 and the housing chamber 338. The cup lip 340 contacts the surface that is to be manipulated by the suction cup 10. The flexible wall 334 is deformable into the housing chamber 338 as illustrated in FIG. 14. The deformable flexible wall enables the creation of suction in the cup chamber 336. The flexible wall 334 is coupled with the attachment portion 318.

In operation, the suction cup assembly 10 includes the actuator 300 in a neutral position as illustrated in FIG. 13. Here, the flexible cup 320 may be positioned into contact with the surface of a part to be manipulated. The flexible cup 320 is positioned onto the surface. The cup lip 340 contacts the surface. Here, the flexible cup 320 has a starting volume, zero or neutral volume. Air is activated to increase fluid pressure in the lower portion of the chamber 304. As this occurs, the piston 314 moves upward and the flexible wall 334 deform and move into the housing chamber 338. As this occurs, the cup chamber 336 is deformed. The deformation of the cup chamber 336 increases its volume by 2 to 3 times as seen in FIG. 14. Thus, this causes the pressure level inside of the cup chamber 336 to drop relative to atmospheric pressure, creating a vacuum inside of the cup chamber 336. Thus, the lip 340 secures and seals with the surface of the part to be manipulated. The spring 328 expands as the spring 326 contracts in the housing 302.

After the part has been moved to its desired position, the fluid pressure in the upper portion of the chamber 304 is increased. As this occurs, the piston assembly 312 reverses its direction causing the mounting portion 318 to push against the flexible wall 334. As this occurs, the flexible wall 334 exits the cup chamber 336 as illustrated in FIG. 15. This causes a negative volume in the cup chamber 336 forcing the part from the flexible cup 320. Thus, by a simple increase and decrease of the fluid pressure, the suction cup 320 moves from a first position, where a vacuum in the cup chamber 336 will increase due to the increased volume position of the cup chamber, to a second position, where the cup chamber 336 is in a negative volume position, with the part being manipulated or held by the flexible cup 320 as released from it.

Additionally, the suction cup 320 can be operated such that it moves from a first position illustrated in FIG. 13 to a second position illustrated in FIG. 14 and back to the first position illustrated in FIG. 13 to move the suction cup between its positions as described above.

Figure 16:
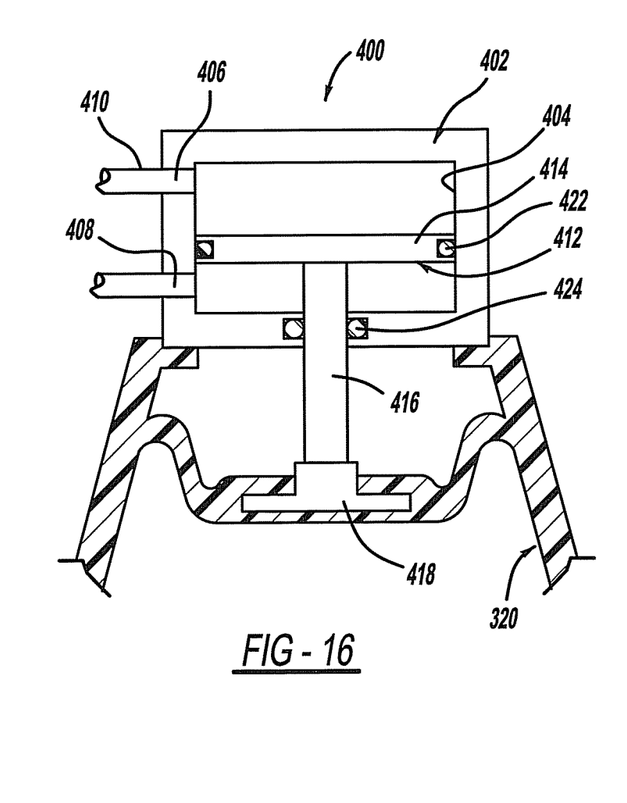
FIG. 16 is a cross-section view of another embodiment of a suction cup assembly in a neutral position.
Figure 17:
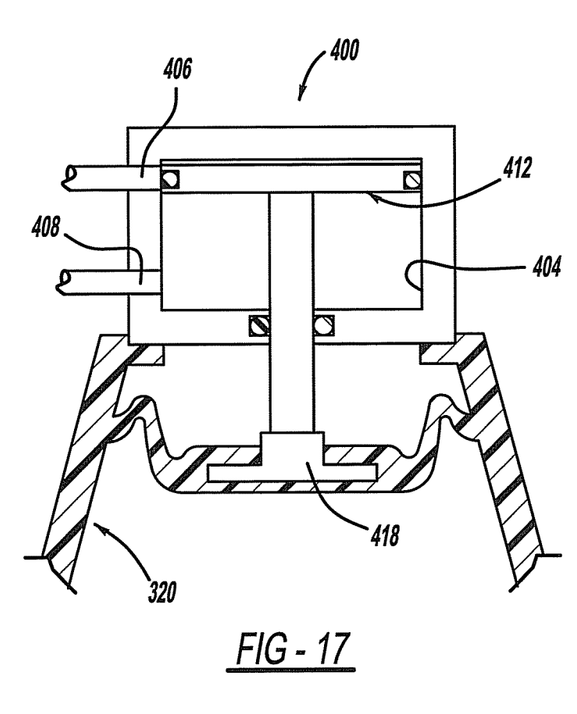
FIG. 17 is a view like FIG. 16 with the suction cup assembly in an increased volume position.

Turning to FIGS. 16 and 17, a pancake type of fluid actuator is illustrated. The actuator 400 includes a housing 402 with a chamber 404. An inlet 406 and an outlet 408 enable fluid to enter into the chamber 404 via the hoses 410. A piston assembly 412 is illustrated in the chamber. The piston assembly 412 includes a piston 414 and a piston shaft 416. The piston shaft 416 includes an attachment member 418 that secures with the cup 320. Seals 422, 424 seal the piston assembly 412 in the chamber 404. Here, fluid pressure is required to hold the actuator in both a increased volume position as illustrated in FIG. 17 and a neutral or zero position illustrated in FIG. 16. The cup 320 is like that explained above.

In operation, the suction cup assembly is in a neutral position as illustrated in FIG. 16. Here, the flexible cup 320 may be positioned into contact with the surface of a part to be manipulated. The flexible cup 320 is positioned onto the surface. The cup lip 340 contacts the surface. Here, the flexible cup 320 has a starting volume, zero or neutral volume: Fluid pressure is increased and enters through outlet 408 into the bottom portion of the chamber 404. As this occurs, the flexible wall 334 deforms and moves into the housing chamber 338. As this occurs, the cup chamber 336 is deformed. The deformation of a cup chamber 336 increases its volume by 2 to 3 times as seen in FIG. 17. As this occurs, it causes a pressure level inside the cup chamber 336 to drop relative to atmospheric pressure, creating a vacuum inside of the cup chamber 336. Thus, the lip 340 secures and seals with the surface of the part to be manipulated.

After the part has been moved to its desired position, the air pressure is reversed. This causes the air pressure in the upper portion of the chamber 404 to be increased moving the piston assembly 412 back to a neutral position. Thus, the suction cup 320 moves from a first position, where a vacuum in the cup chamber 336 will increase due to the increased volume position of the cup chamber, to a second position, where the cup chamber 336 is in a neutral position where the part being manipulated or held by the flexible cup 320 may be released from it. Additionally, the piston assembly may be manipulated such that the flexible wall 334 exits the cup chamber 336. Here, a negative volume would be created in the cup chamber 336 as explained above.

Figure 18:
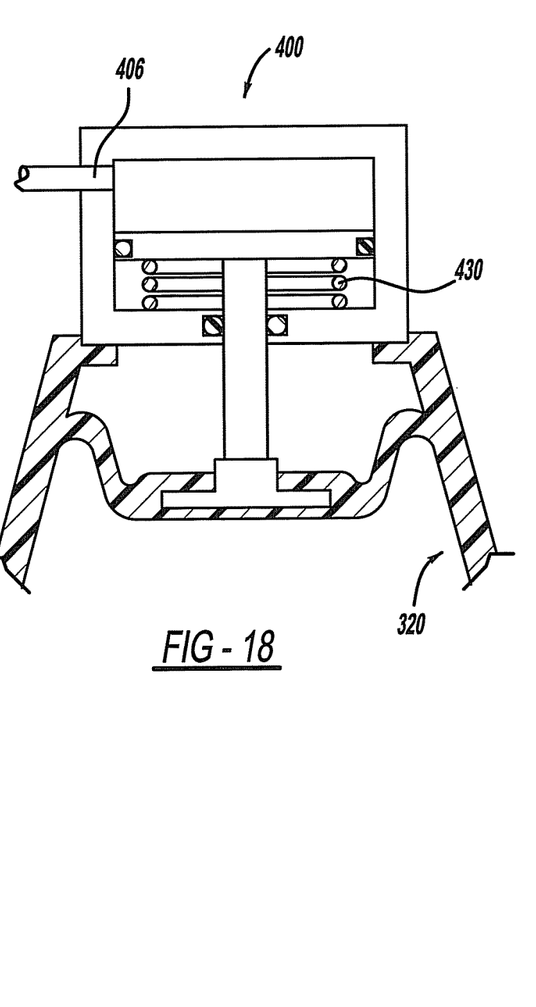
FIG. 18 is a cross-section view of another embodiment of a suction cup assembly in a neutral position.
Figure 19:
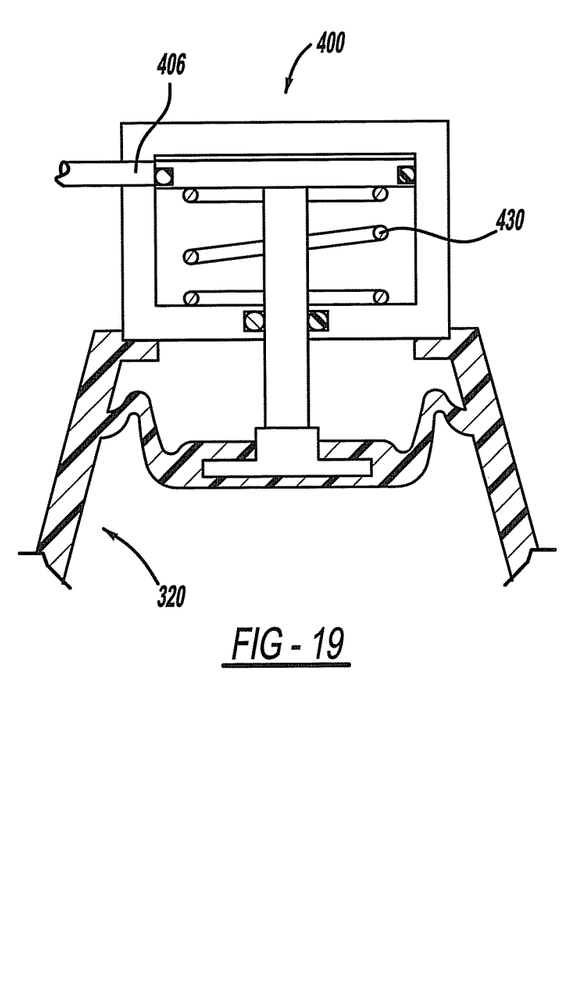
FIG. 19 is a view like FIG. 18 with the suction cup assembly in an increased volume position.

Turning to FIGS. 18 and 19, an additional embodiment is disclosed. Here, a pancake style single acting spring return cylinder is illustrated. The difference between those in FIGS. 16 and 17 is that a return spring 430 is included and outlet 408 is eliminated. The return spring 430 enables fluid pressure entering into the inlet 406 to be terminated to enable the spring 430 to expand which, in turn, manipulates the suction cup 320 into its positive pressure position as illustrated in FIG. 19. Thus, the actuator 400' functions similar to the actuator of FIGS. 16 and 17 with the spring taking over for the fluid pressure in the lower portion of the chamber to move the piston assembly 412 upward which, in turn, deforms the cup chamber 336 to increase its volume by 2 to 3 times as seen in FIG. 19.

Fluid pressure again enters into the upper portion of the chamber 404. This causes the piston assembly 412 to move back to a neutral position as illustrated in FIG. 18. Thus, the cup chamber 336 moves to a neutral volume position where the part being manipulated or held by the flexible cup 320 is released from it.

Figure 20:
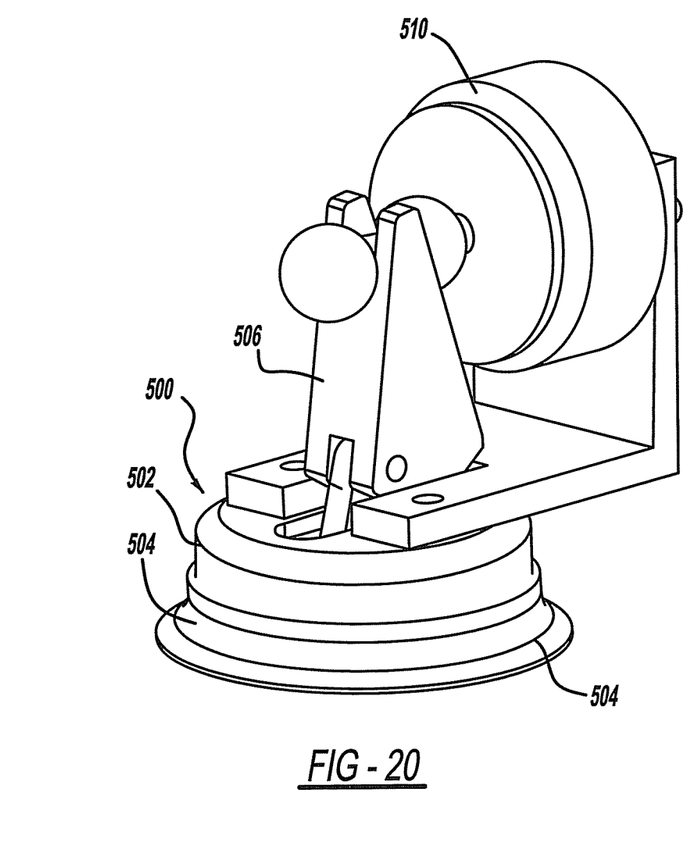
FIG. 20 is a perspective view of another embodiment of a suction cup assembly in a neutral position.
Figure 21:
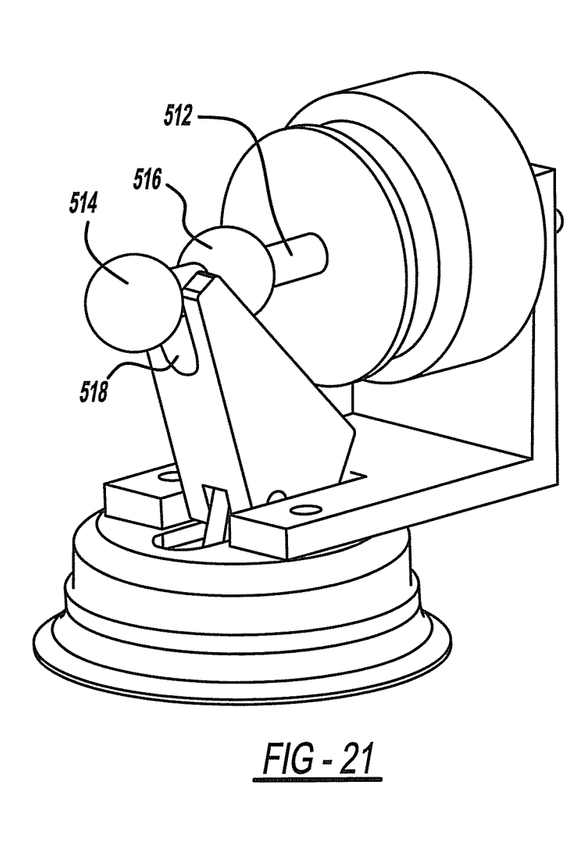
FIG. 21 is a view like FIG. 20 with the suction cup assembly in an increased volume position.

Turning to FIGS. 20 and 21, an additional embodiment is illustrated. Here, the suction cup assembly 500 includes a housing 502 with a cup 504 hermetically sealed to it. A cam lever 506 is coupled with the cup 504 like that previously described. Thus, as the cam level 506 moves from a first position to a second position, the cup 504 is moved from the neutral volume position to the increased volume position as previously discussed. An actuator 510 is coupled with the cam lever 506. The actuator 510 may be of a solenoid type electric actuator or a pneumatic rotary actuator. In either case, a shaft 512 extends from the actuator 510. The shaft includes a pair of stops 514, 516 with a portion of the shaft 512 between the stops. The lever 506 includes a yoke 518 that fits between the stops 514, 516. The shaft 512 moves in and out of the actuator 510 moving the suction cup 504 between a neutral and positive volume position as described above. Additionally, a housing covers the actuator 510 and the lever 506. The housing is coupled with housing 502 to seal and protect the lever 506 and actuator 510.

The description of the disclosure is merely exemplary in nature and thus, variations that do not depart from the gist of the disclosure are intended to be within the scope of the disclosure. Such variations are not to be regarded as a departure from the spirit and scope of the disclosure.

What is claimed is:
1. A suction cup assembly comprising:
   a housing including a wall;
   an actuator in said housing;
   a flexible cup including a mechanism receiving the housing wall, the flexible cup hermetically sealed with the hous- ing, and the flexible cup including a wall portion coupling with a mounting portion of the actuator, the actuator mounting portion is coupled with the wall portion of the flexible cup, the actuator moves between at least two positions, in a first position, the actuator moves the flexible cup to increase volume inside the flexible cup, wherein the flexible cup, due to a decrease in pressure inside the flexible cup, seals with a surface, in a second position, the actuator moves the flexible cup into at least a neutral volume position returning the inside of the flexible cup to a neutral position, wherein the flexible cup releases from the surface.

2. The suction cup assembly of claim 1, wherein the flexible cup includes a lip for engaging the surface.

3. The suction cup assembly of claim 1, wherein the actuator is an electric or closed pneumatic system.

4. The suction cup assembly of claim 3, wherein the actuator is a solenoid or a servo motor.

5. The suction cup assembly of claim 4, wherein the actuator is a magnetically latched solenoid.

6. The suction cup assembly of claim 3, wherein the actuator is a three position solenoid with a solenoid armature coupled with the suction cup or a servo motor with a thread shaft having three preprogrammed positions.

7. The suction cup assembly of claim 3, wherein the actuator is a double acting pneumatic cylinder, a pancake double acting pneumatic cylinder, a spring return pancake pneumatic cylinder, or a pneumatic rotary actuator.

8. The suction cup assembly of claim 3, wherein the actuator includes a mechanism providing a direct pull on the flexible cup moving it between positions.

9. The suction cup assembly of claim 3, wherein the flexible cup includes a lever, the lever is moved by the actuator.

10. The suction cup assembly of claim 1, wherein the flexible cup includes a deformable flexible wall enabling movement between the positions.

11. An electrical suction cup assembly comprising:
a housing including a wall;
an electrical actuator in said housing;
a flexible cup including a mechanism receiving the housing wall, and coupling the flexible cup with said housing, the flexible cup including a wall portion coupling with a mounting portion of the electrical actuator, the cup being engagable with a surface, the electrical actuator coupled with the cup wall portion wherein the actuator movement causes the flexible cup to move between at least two positions, in a first position, the electric actuator moves the flexible cup to increase volume inside the flexible cup, wherein the flexible cup, due to a decrease in pressure inside the flexible cup, seals with the surface, in a second position, the electric actuator moves the flexible cup into at least a neutral volume position returning the inside of the flexible cup to a neutral position, wherein the flexible cup releases from the surface.

12. The electrical suction cup assembly of claim 11, wherein the flexible cup is sealed to the housing.

13. The electrical suction cup assembly of claim 11, wherein the actuator is a solenoid or servo motor coupled with the flexible cup.

14. The electrical suction cup assembly of claim 11, wherein a lever extends from the cup and the actuator is coupled with the lever.

15. The electrical suction cup assembly of claim 11, wherein the flexible cup further comprises a flexible wall enabling the cup to move between the positions.

16. The electrical suction cup assembly of claim 15, wherein the actuator is coupled with the flexible wall.

17. The electrical suction cup assembly of claim 11, wherein the suction cup moves to a third position, in the third position the suction cup is in a negative volume position wherein the suction cup forces the surface from the suction cup.

18. The suction cup assembly of claim 17, wherein the actuator is a three position solenoid with a solenoid armature coupled with the suction cup or a servo motor with a thread shaft having three preprogrammed positions.

* * * * *